(12) United States Patent
Nikitin et al.

(10) Patent No.: US 8,003,304 B2
(45) Date of Patent: Aug. 23, 2011

(54) METHOD FOR MANUFACTURING A PERPENDICULAR MAGNETIC WRITE POLE USING AN ELECTRICAL LAPPING GUIDE FOR TIGHT WRITE POLE FLARE POINT CONTROL

(75) Inventors: Vladimir Nikitin, Campbell, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 835 days.

(21) Appl. No.: 12/023,892

(22) Filed: Jan. 31, 2008

(65) Prior Publication Data
US 2009/0197208 A1    Aug. 6, 2009

(51) Int. Cl.
*G11B 5/127* (2006.01)
(52) U.S. Cl. ........ 430/314; 430/313; 430/319; 430/320; 29/603.09; 29/603.1; 29/603.15; 451/5; 451/8
(58) Field of Classification Search .................. None
See application file for complete search history.

(56) References Cited

U.S. PATENT DOCUMENTS

| | | | |
|---|---|---|---|
| 5,065,483 A | 11/1991 | Zammit | 29/603 |
| 5,361,547 A | 11/1994 | Church et al. | 451/5 |
| 5,597,340 A | 1/1997 | Church et al. | 451/5 |
| 5,722,155 A | 3/1998 | Stover et al. | 29/603.1 |
| 5,816,890 A | 10/1998 | Hao et al. | 451/5 |
| 6,003,361 A | 12/1999 | Amin et al. | 73/7 |
| 6,047,224 A | 4/2000 | Stover et al. | 700/119 |
| 6,230,389 B1 | 5/2001 | Zhu | 29/603.1 |
| 6,347,983 B1* | 2/2002 | Hao et al. | 451/57 |
| 6,532,646 B2 | 3/2003 | Watanuki | 29/603.12 |
| 6,609,948 B1 | 8/2003 | Fontana, Jr. et al. | 451/5 |
| 6,779,249 B2 | 8/2004 | Santini | 79/603.09 |
| 6,884,148 B1 | 4/2005 | Dovek et al. | 451/5 |
| 6,935,923 B2 | 8/2005 | Burbank et al. | 451/5 |
| 6,950,289 B2 | 9/2005 | Lam et al. | 360/316 |
| 6,997,784 B2 | 2/2006 | Bunch et al. | 451/41 |
| 7,014,530 B2 | 3/2006 | Kasiraj et al. | 451/8 |
| 7,092,212 B2 | 8/2006 | Onodera | 360/234.5 |
| 2002/0053129 A1 | 5/2002 | Watanuki | 79/603.07 |
| 2002/0112343 A1* | 8/2002 | Goubau et al. | 29/603.09 |
| 2008/0072418 A1* | 3/2008 | Kondo et al. | 29/603.12 |
| 2008/0144215 A1* | 6/2008 | Hsiao et al. | 360/119.04 |
| 2008/0186513 A1* | 8/2008 | Ono | 356/614 |

* cited by examiner

*Primary Examiner* — John A. McPherson
(74) *Attorney, Agent, or Firm* — Zilka-Kotab, PC

(57) ABSTRACT

A method for manufacturing a magnetic write head for perpendicular magnetic recording. The method provides for accurate definition of a device feature such as a write pole flare point. A functional lapping guide is formed to determine when a lapping operation should be terminated to define an air bearing surface of a slider. In order to provide accurate compensation for manufacturing variations in the functional lapping guide, a dummy lapping guide is provided. An amount of variation of a front edge of the dummy lapping guide, which is defined by the same process step as a writer pole flare point, can be calculated by measuring the width (stripe height) of the dummy lapping guide based on its electrical resistance. Since the back edges of the dummy lapping guide and functional lapping guide are defined by the same manufacturing steps, the back edge of the functional lapping guide can then be determined, and used for accurately control of the writer flare point through their correlation established from the dummy lapping guide.

19 Claims, 16 Drawing Sheets

METHOD FOR MANUFACTURING A PERPENDICULAR MAGNETIC WRITE POLE USING AN ELECTRICAL LAPPING GUIDE FOR TIGHT WRITE POLE FLARE POINT CONTROL

FIELD OF THE INVENTION

The present invention relates to perpendicular magnetic recording and more particularly to a method for manufacturing a magnetic write pole with a tightly controlled flare point.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to hinge out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, referred to as a spacer layer, sandwiched between first and second ferromagnetic layers, referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

Certain design parameters are important to efficient write head performance, such as, for example, the flare point of the write head. However, as the write heads become ever smaller, it becomes ever more difficult to control these desired parameters to the accuracy needed. Therefore, there is a need for a structure and/or method of manufacture that can allow these write head parameters to be accurately controlled even in very small write heads.

SUMMARY OF THE INVENTION

The present invention provides a method for manufacturing a magnetic write head for perpendicular magnetic recording. A device having a feature is formed on a substrate, along with a functional lapping guide and a dummy lapping guide. An amount of hack edge variation of the dummy lapping guide is determined based on the electrical resistance of the dummy lapping guide. Since this back edge variation of the dummy lapping guide corresponds to a back edge variation of the functional lapping guide, the actual location of the back edge of the functional lapping guide can be accurately determined.

The present invention, therefore, allows the back edge of the functional lapping guide to be accurately located and therefore, allows a feature of the device to be very accurately located relative to an air bearing surface, even in spite of various manufacturing variances such as from photolithographic alignment, variations from ton milling operations, etc.

The method can be used to construct a write pole having a flare point that is accurately located relative to the air bearing surface. The method can also be used to construct a trailing or wrap-around magnetic shield having a very accurately controlled throat height as measured from the ABS. The method can even be used to accurately define the stripe height of a magnetoresistive sensor.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
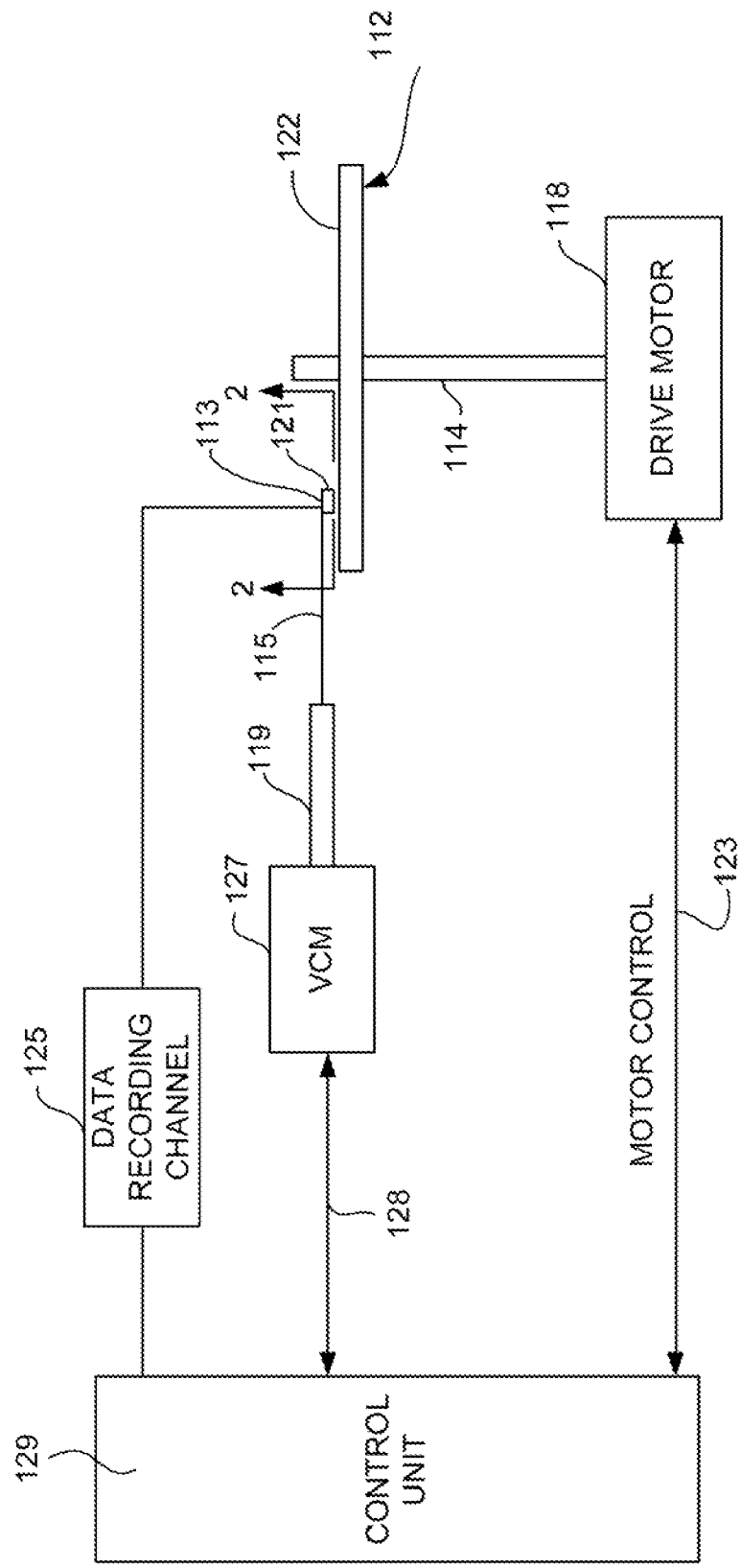
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances die slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
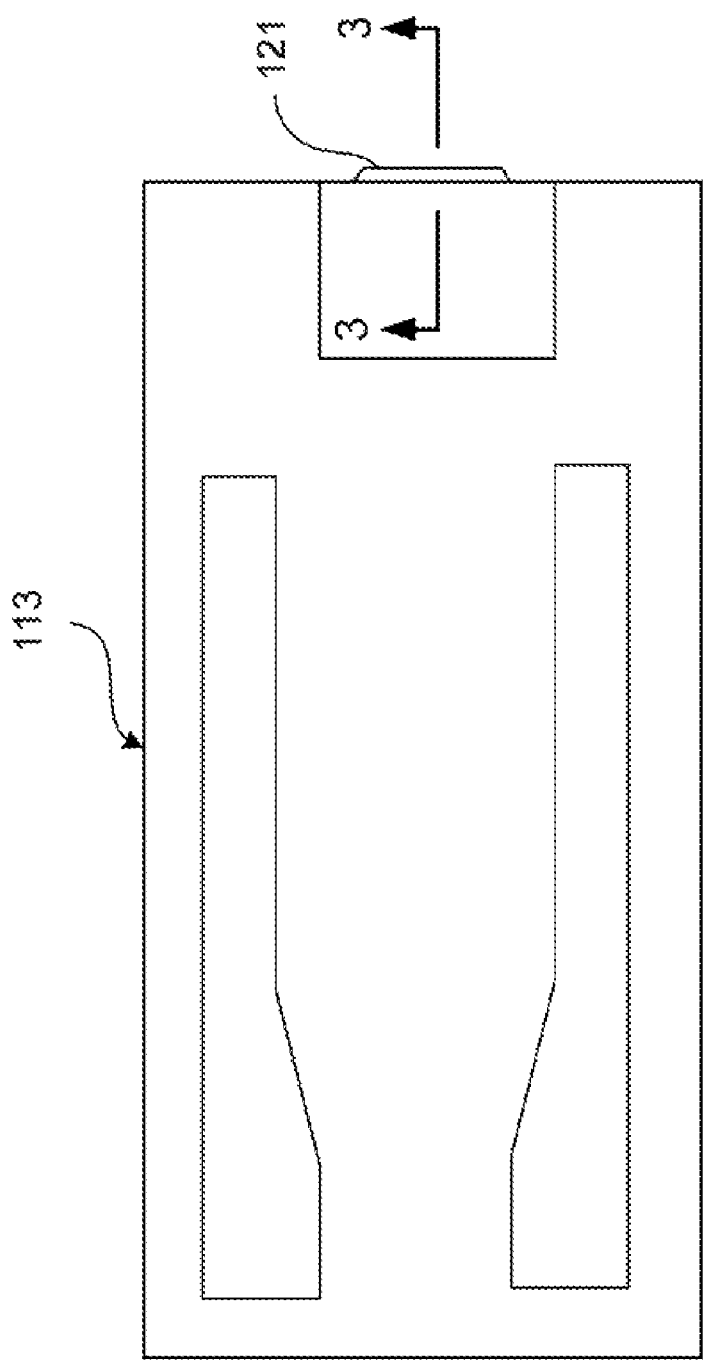
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
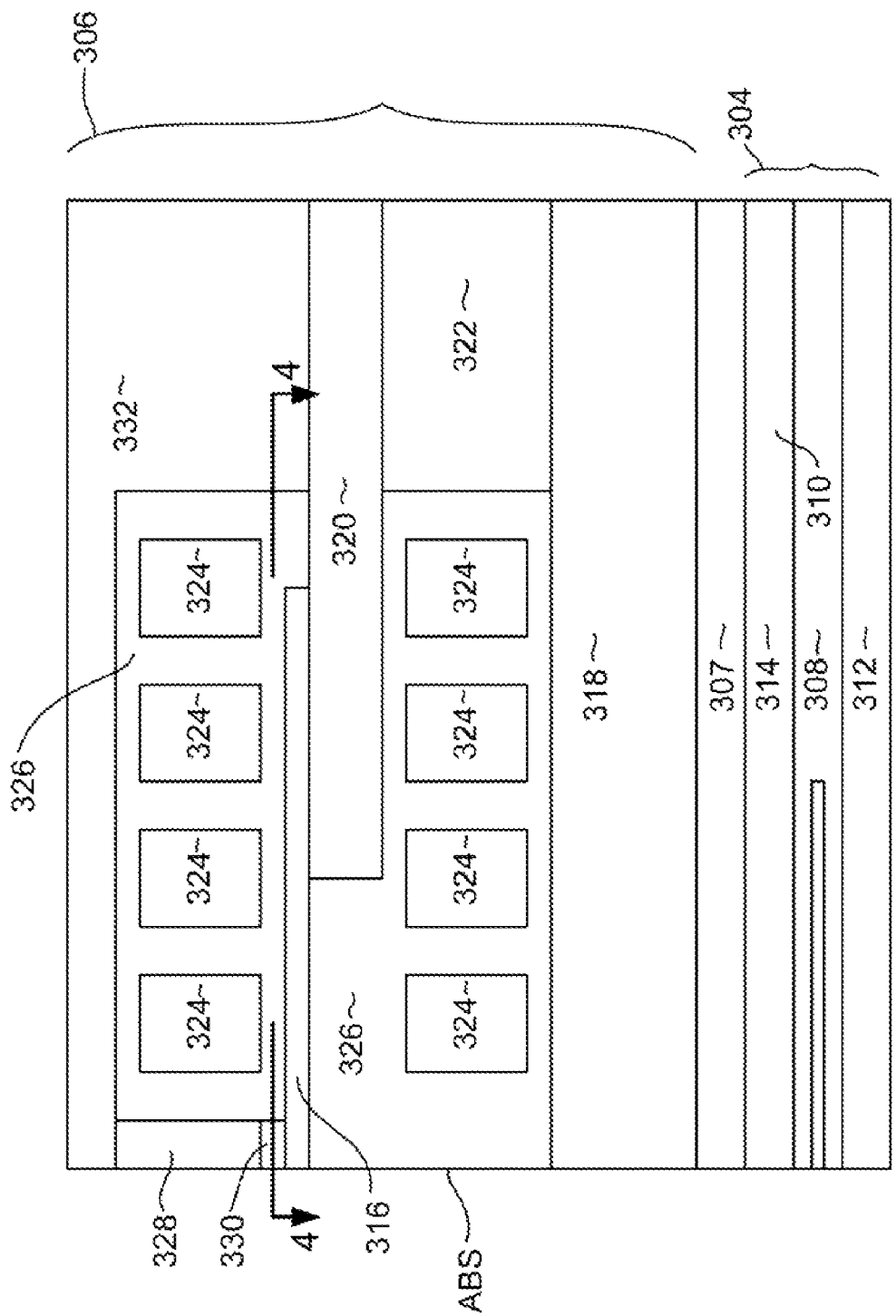
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3, the invention can be embodied in a magnetic head 302, that includes a read head 304 and a write head 306, which can be separated from one another by an insulation layer 307. The read head 304 can include a magnetoresistive sensor 308 embedded in an insulation layer 310 and sandwiched between first and second magnetic shields 312, 314.

The write head can include a magnetic write pole 316 that extends to an air bearing surface (ABS) and a magnetic return pole 318 that also extends to the ABS, but which has a cross section at the ABS that is much larger than that of the write pole. The write pole 316 can be formed upon and magnetically connected with a magnetic shaping layer, 320, which can be magnetically connected with a magnetic back gap layer 322 that magnetically connects the write pole 314 and shaping layer 320 with the magnetic return pole 318.

An electrically conductive, non-magnetic write coil 324 passes between the write pole 316 and return pole 318, and may also pass above the write pole 316. The write coil 324 is shown in cross section in FIG. 3 and may be constructed as one or more pancake coils, or can be a helical coil. The write coil 324 can be embedded in one or more insulation layers 326.

A trailing shield (or wrap around shield) 328 can be provided at the ABS, separated from the write pole by a non-magnetic trailing gap 330. The trailing shield can also be magnetically connected with the shaping layer 320 and back gap 322 by a trailing return pole 332.

During operation, the write coil 324 causes a magnetic field that induces a magnetic flux in the write pole 316. A write field (not shown) is emitted from the tip of the write pole 316 toward a magnetic medium (also not shown). This write field causes a magnetic flux to travel through the magnetic medium where it returns to the return pole. The write field emitting from the write pole is sufficiently concentrated and strong that it magnetizes a magnetically hard top layer of the magnetic medium. However, because the cross section of the return pole 318 is much larger than that of the write pole 316, the magnetization of the medium is not affected by the return of magnetic flux to the return pole 318.

The presence of the trailing shield 316 increases the speed with which the write head 306 can write data by increasing the field gradient of the write field emitting from the tip of the write pole 316. The trailing shield 318 accomplishes this by slightly canting the write field so that it is not perfectly perpendicular to the medium (not shown).

Figure 4:
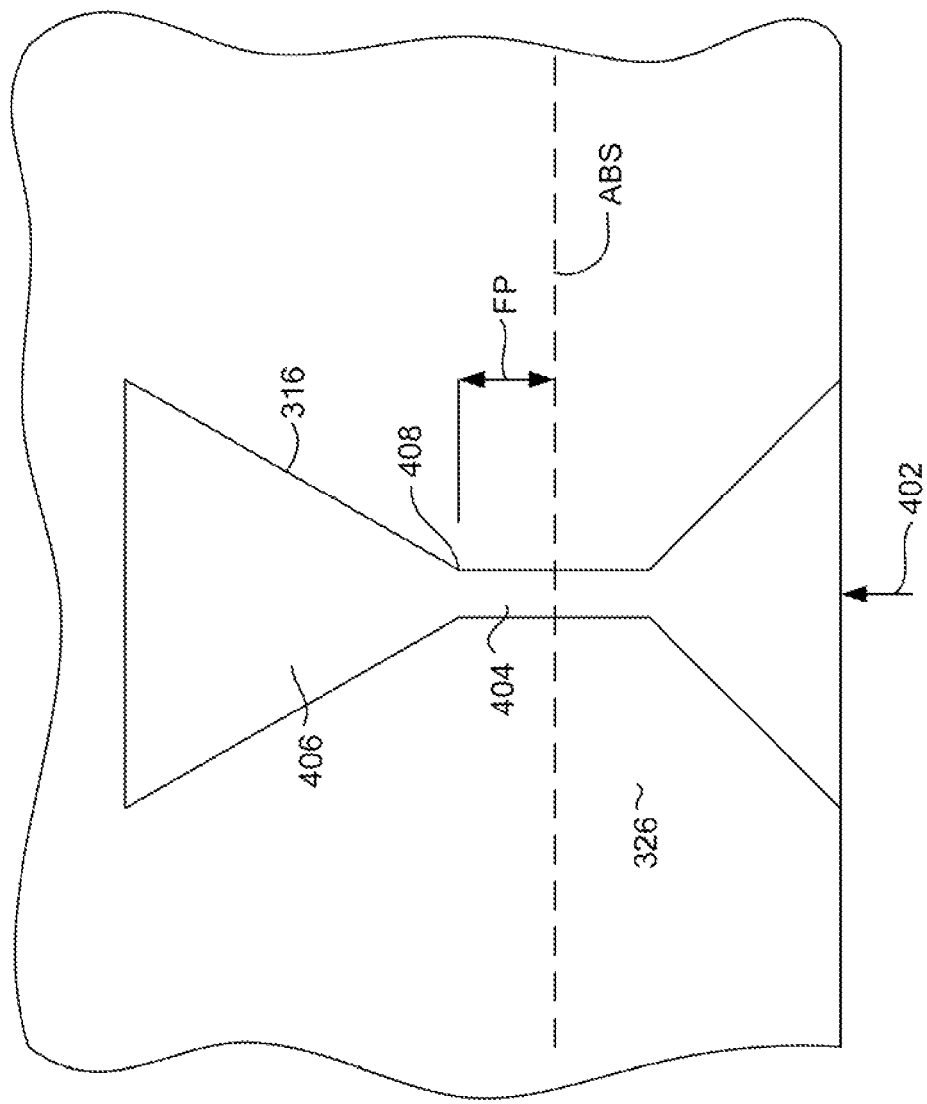
FIG. 4 is top down view of a write pole of a write head in an unfinished stage of manufacture.

With reference now to FIG. 4, a top down view of the write pole 316 can be seen in an unfinished state of manufacture. The write head 316 is shown in FIG. 4 before the air bearing surface has been formed by lapping. An intended location of an air bearing surface plane (ABS plane) is indicated by the dashed line referenced as ABS. As will be appreciated by those skilled in the art, a large number of write heads are manufactured on a single wafer. After manufacture is nearly complete, these wafers are cut into rows of write heads, and a lapping operation is performed to remove material from the direction indicated by arrow 402. Ideally, the lapping operation is terminated exactly at the point when the lapping operation has reached the ABS plane.

With continued reference to FIG. 4, the write pole 316 has a narrow pole tip portion 404, and also has a wider flared portion 406. The location of transition between the throat portion 404 and the flared portion 406 is the flare point 408. The distance between the flare point 408 and the ABS is the flare point length FP, and this distance FP is a dimension that is critical to write head performance. If the flare point is too small, excessive magnetic field will leak from the flared portion to the medium causing adjacent track interference and other problems. If the flare point is too large, the magnetic flux to the pole tip will be choked off (ie. the pole tip will become saturated) and write field strength will suffer. The present invention provides a process for reliably and accurately locating the flare point by providing an accurate indication of when lapping should be terminated. This will be better understood in light of the discussion below.

The present invention provides a means for using an electrical lapping guide to accurately determine when lapping should be terminated. The invention also provides a way to account for and compensate for lapping guide variances that result from various manufacturing processes such as photolithographic patterning variances and variances due to processes such as ion milling. Although the write pole flare point has been discussed above, this is by way of example. The invention can be used to accurately define other features as well, which require accurate definition of their front edges measured from the air bearing surface.

Figure 5:
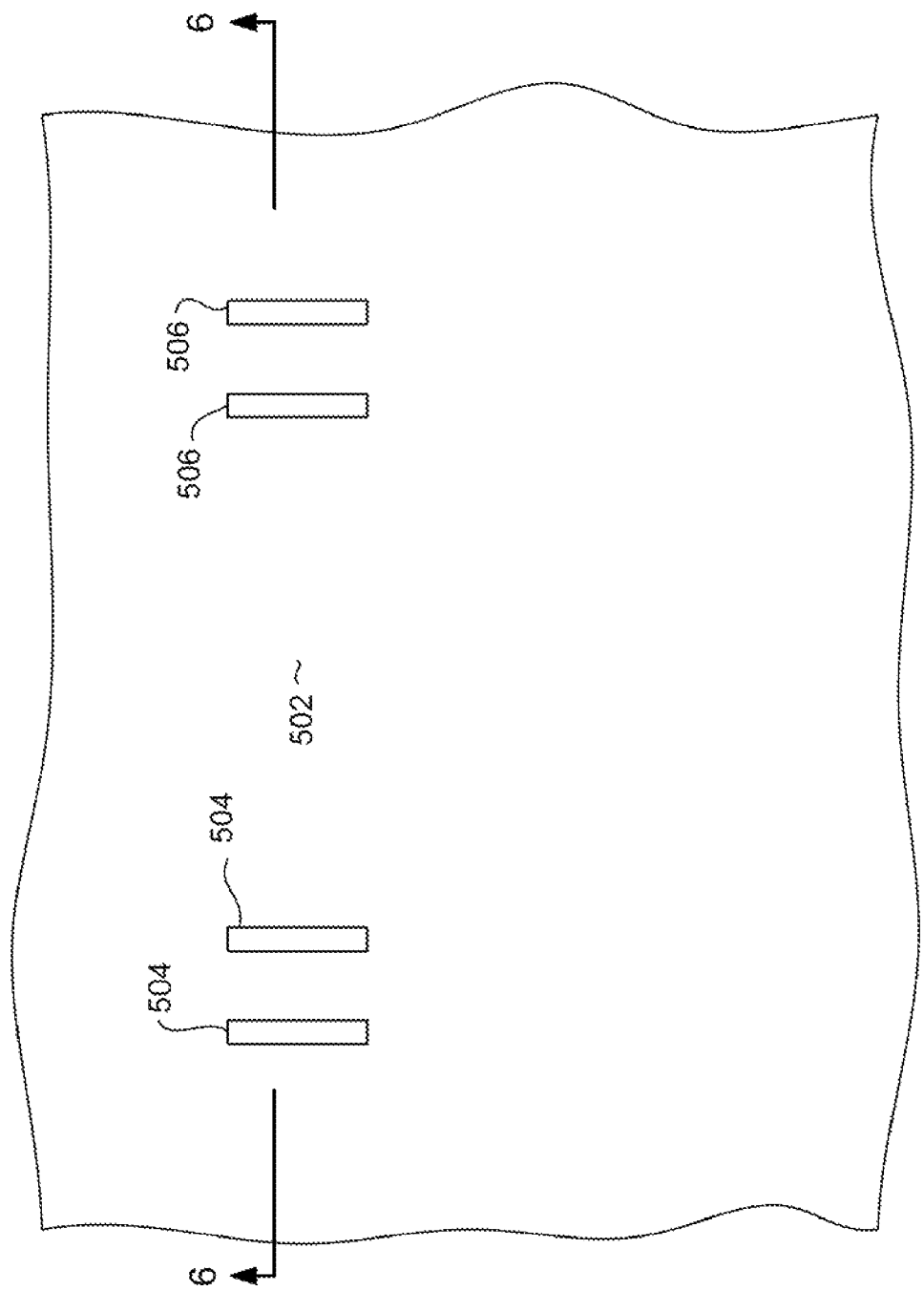
FIGS. 5-12 are illustrations of a write head in various intermediate stages of manufacture illustrating a method of manufacturing a magnetic write head according to an alternate embodiment of the invention.

With reference to FIGS. 5-12 an example of a process for manufacturing a pair of Sapping guides is described. With particular reference to FIG. 5, a substrate 502 (FIG. 6) is provided and a first pair of leads 504 and a second pair of leads 506 are formed on the substrate. The pairs of leads 504, 506 can be formed by a plating and lift off process that can include forming a plating frame mask (not shown), electroplating the leads pairs 504, 506 and lifting off the plating frame mask. An alumina fill layer 508 can then be deposited to cover the leads 504, 506 and a chemical mechanical polishing process (CMP) can be performed sufficiently to expose the leads 504, 506 and planarize the surface of the leads 504, 506 and substrate 502.

Figure 6:
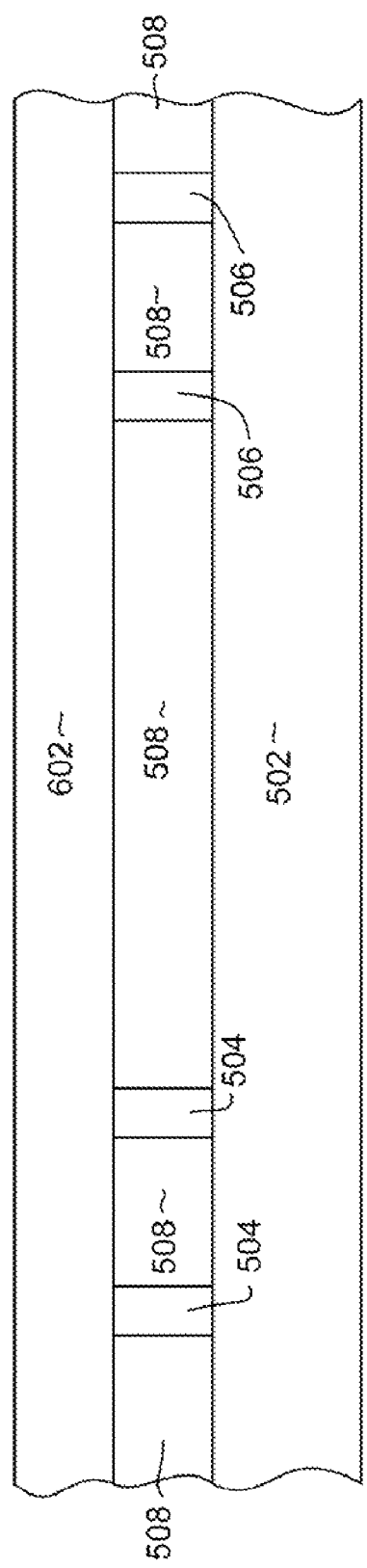

Then, with reference to FIG. 6 a layer of magnetic write pole material 602 is deposited onto the planarized surface of the alumina fill 508 and leads 504, 506. The magnetic write pole material can be a lamination of magnetic layers and thin non-magnetic layers, and can be referred to as a laminate layer 602, although a solid magnetic layer could be used as well.

Figure 7A:
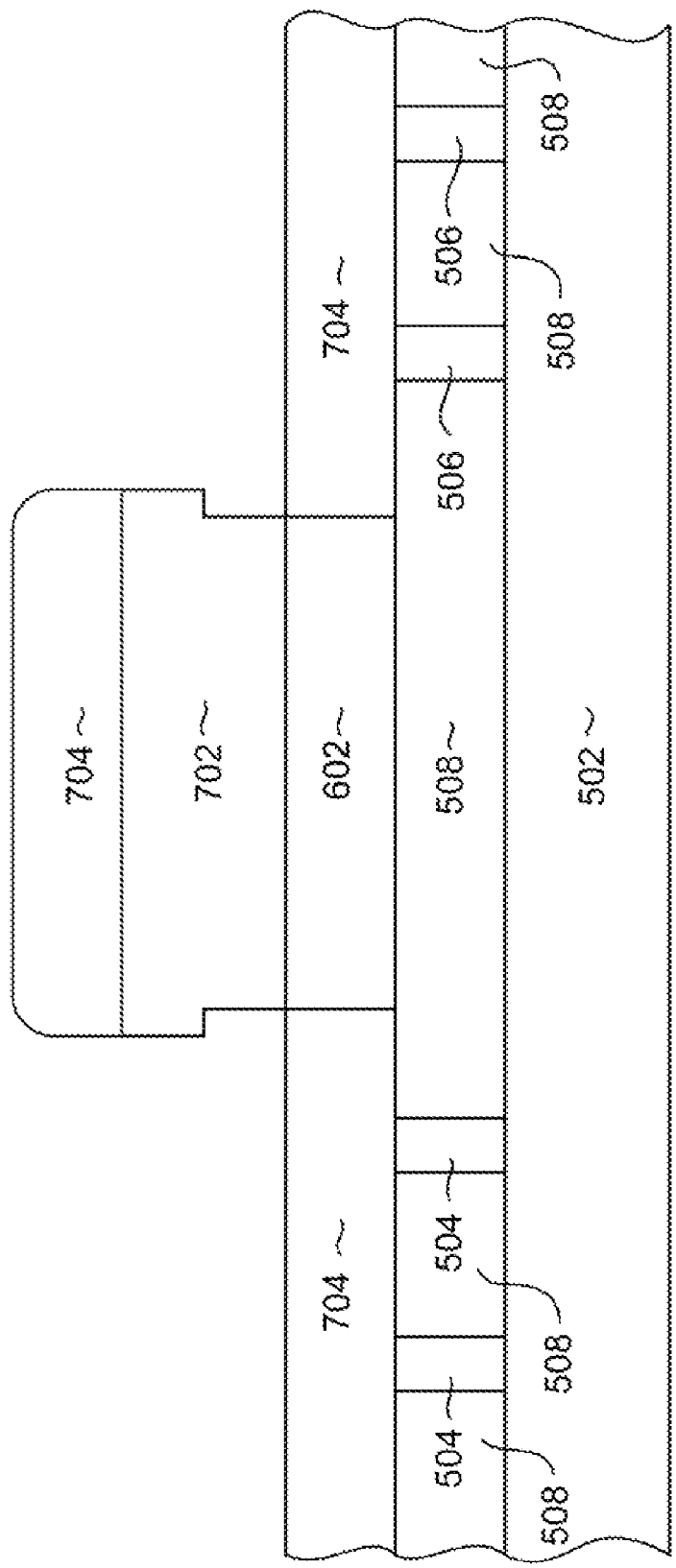

With reference now to FIG. 7A, a bi-layer mask 702 is formed in a region where a write pole will be formed. Regions at either side (where electrical lapping guides will be formed) are left uncovered. An ion milling is then performed to remove portions of the laminate layer 602 in regions that are not covered by the mask 702. A non-magnetic metal 704 such as Ru, Ir, Rh, NiCr, Au, W, Ta, etc. is deposited into the regions where the laminate layer 602 has been removed. This non-magnetic metal layer 704 is preferably deposited to a level that is about equal with the level of the laminate layer 602. After the non-magnetic metal 704 has been deposited, the mask 702 can be lifted off. The bi-layer shape of the mask 702 facilitates lift off.

Figure 7B:
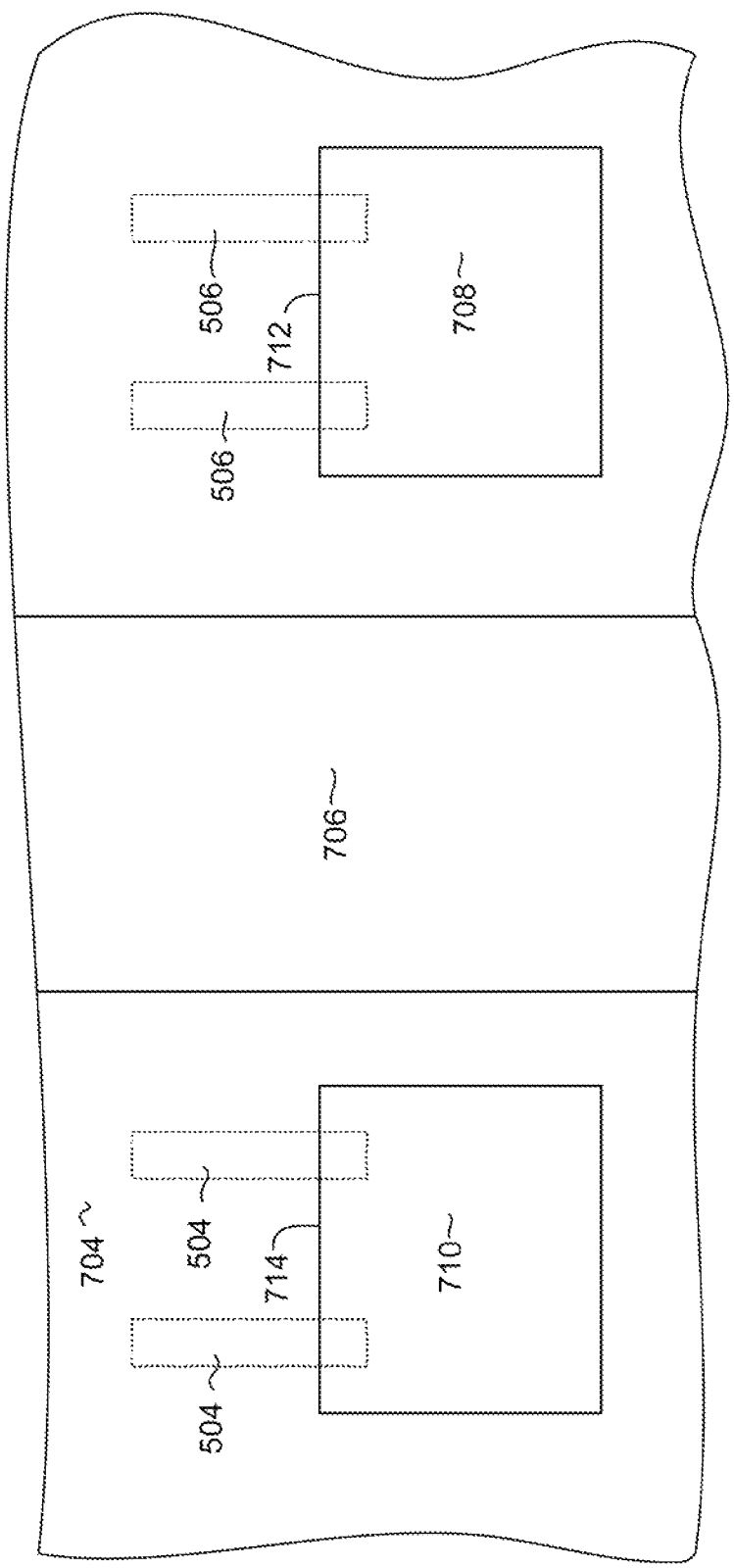
Figure 7C:
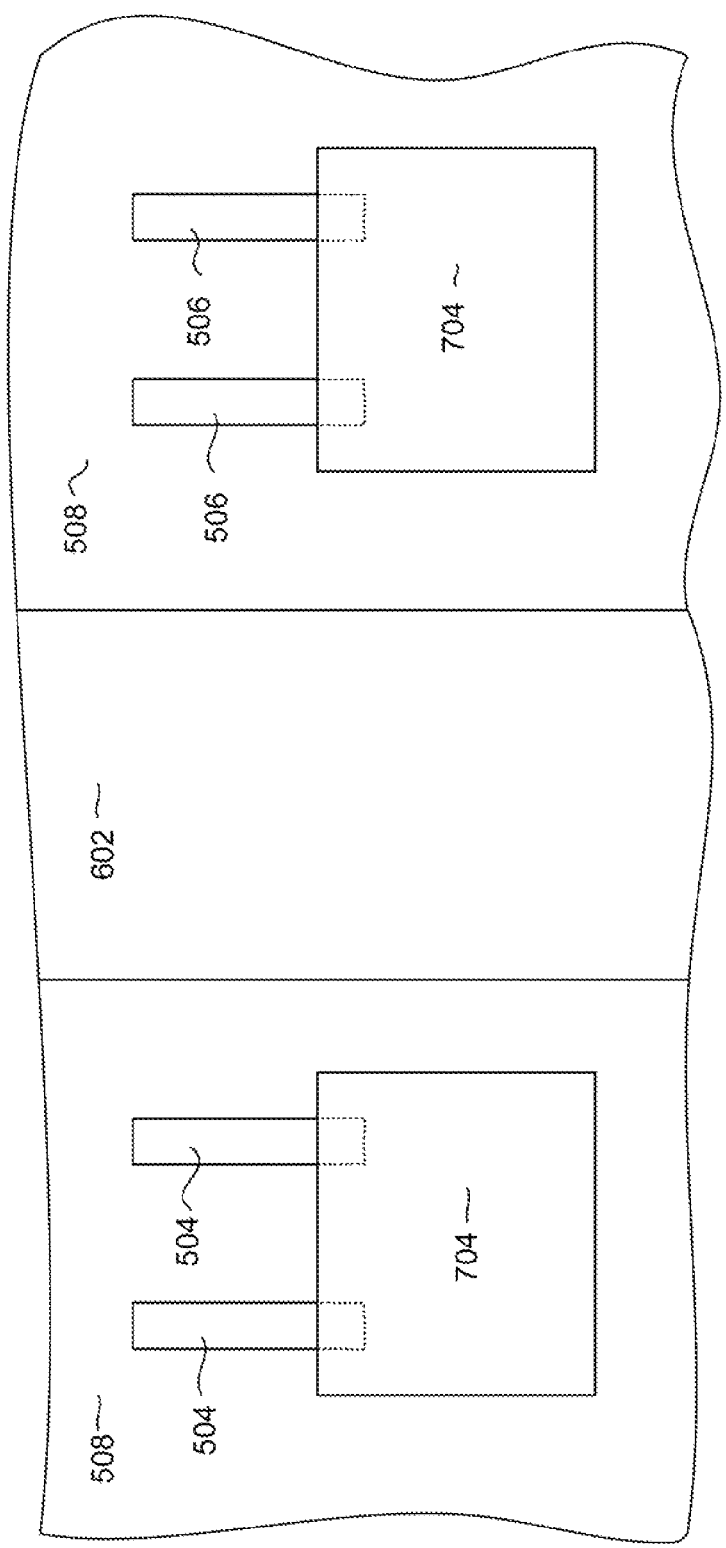

With reference now to FIG. 7B, which shows a top down view, mask structures 706, 708, 710 are formed in a simultaneous, common photolithographic patterning process. The first mask structure 706 covers the area over magnetic write pole material 602 (FIG. 7A). The second mask structure 708 covers a functional ELG area, and the third mask structure 710 covers a dummy ELG area. It should be pointed out that the masks 708, 710 have back edges 712, 714 that are aligned with one another. Pattern 708 and 710 have three widths or three stripe heights (e.g. 1 um, 1.5 um, 3 um) as standard electrical lapping guide does. Then, an ion milling is performed to remove portions of the non-magnetic metal 704 that are not protected by the mask structures 708, 710. The mask structures 706, 708, 710 can then be lifted off, leaving a structure as shown in FIG. 7C.

It should be pointed out that in a row of sliders there will be multiple functional ELGs and multiple dummy ELGs, each having different stripe heights, which will facilitate performing the necessary calculations to effectively use the ELGs. For example, there may be three functional ELGs, and three dummy ELGs, in a row of sliders, although only one functional ELG and one dummy ELG is being described herein for purposes of clarity.

Figure 8:
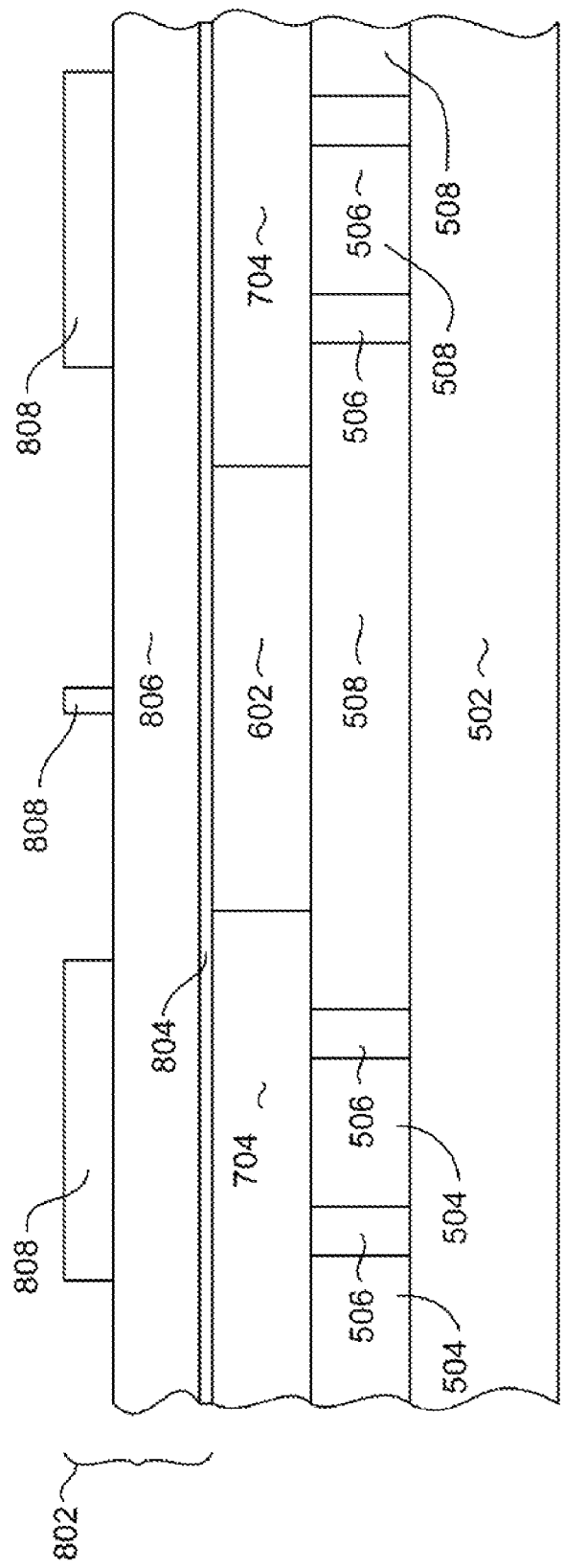
Figure 9A:
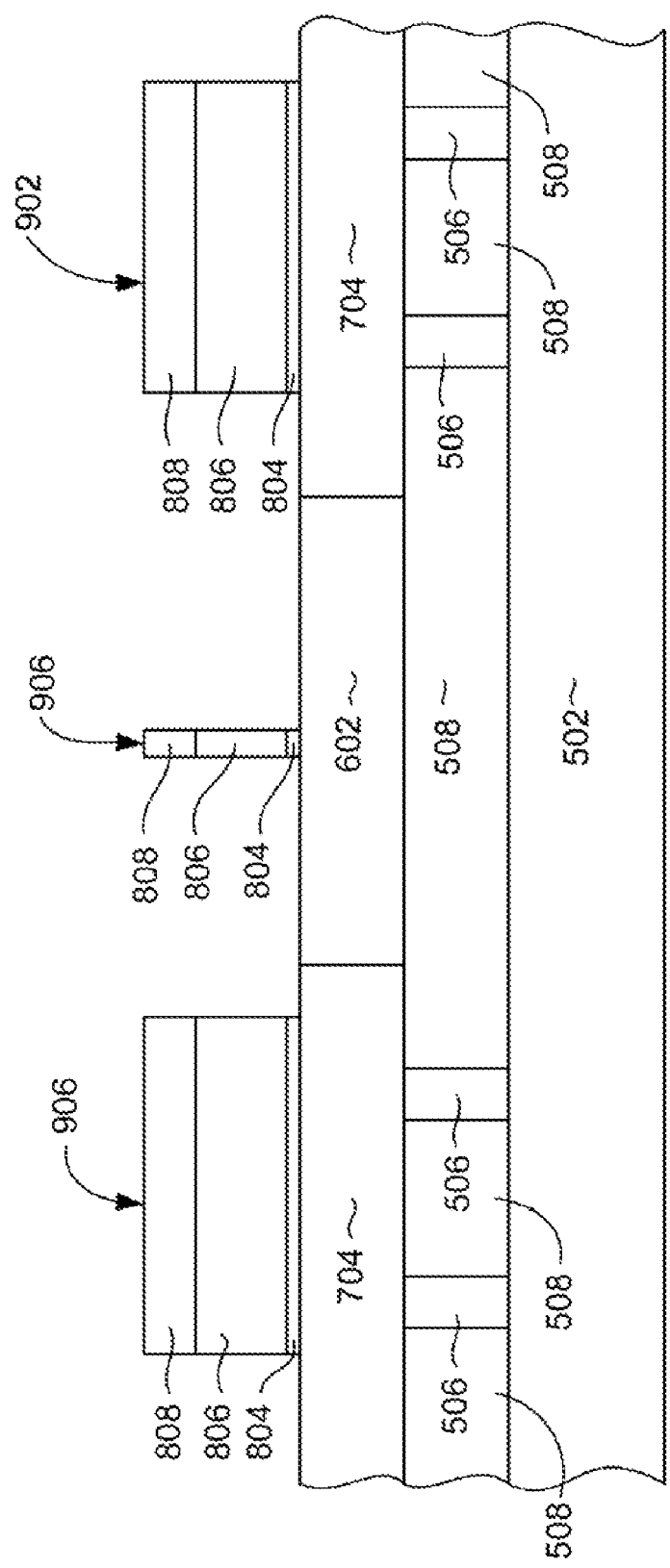

With reference now to FIG. 8, a series of mask layers 802 are then formed over the laminate 602 and non-magnetic metal layer 704. The series of mask layers 802 can include a hard mask layer 804 such as a thin alumina layer, an image transfer layer 806 such as a layer of DURAMIDE® and a photoresist or thermal image resist layer 808. The photoresist layer 808 is photolithographcically patterned and developed to define a write pole structure, and first and second lapping guides. The image of the resist layer 808, can be transferred onto the underlying mask layers 804, 806, by reactive ion etching and or ion milling, resulting in a structure as shown in FIG. 9A.

Figure 9B:
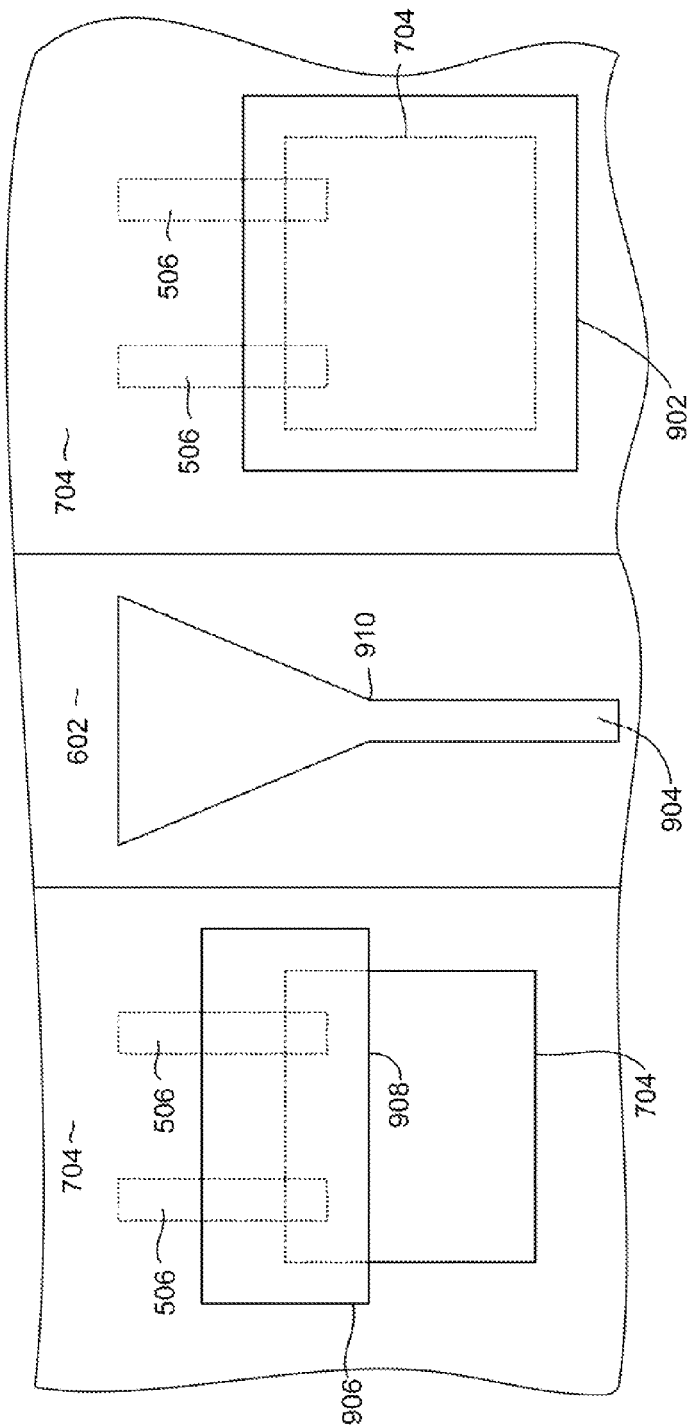

FIG. 9B, shows a top down view of the structure described with reference to FIG. 9A. As can be seen in FIG. 9B, the mask layers 804, 808, 806 form a first mask structure 902, a second mask structure 904 and a third mask structure 906. Portions of layers or structure that are buried beneath the mask layers are 902, 906 are shown in dotted line. The first mask structure covers all of the remaining non-magnetic metal 704 in a region of the functional lapping guide. The second mask structure 904 covers an area that defines a write pole. The third mask structure 906 covers a back portion of the non-magnetic metal 704 in the dummy ELG area, leaving a front portion of the non-magnetic metal 704 uncovered. The third mask structure 906, therefore has a front edge 908 that will define a front edge of a dummy lapping guide as will be seen. The front edge 908 of the third mask structure 906 is self aligned relative to a flare point 910 of the second mask structure.

Figure 10A:
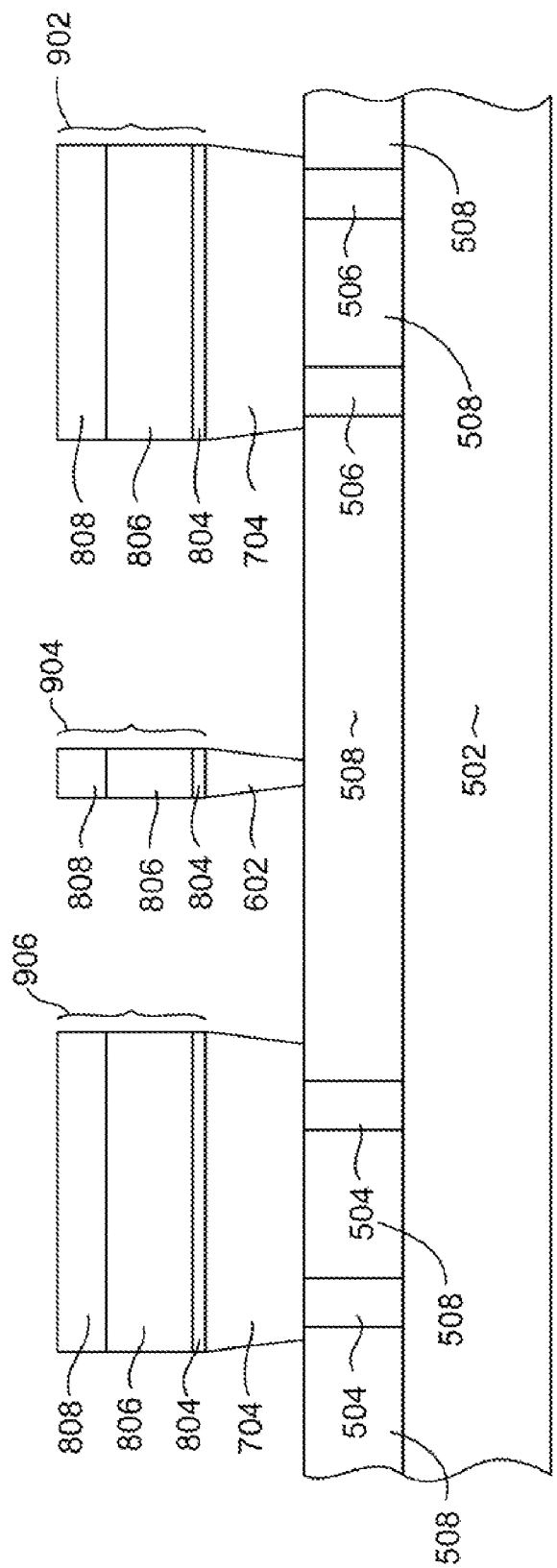
Figure 10B:
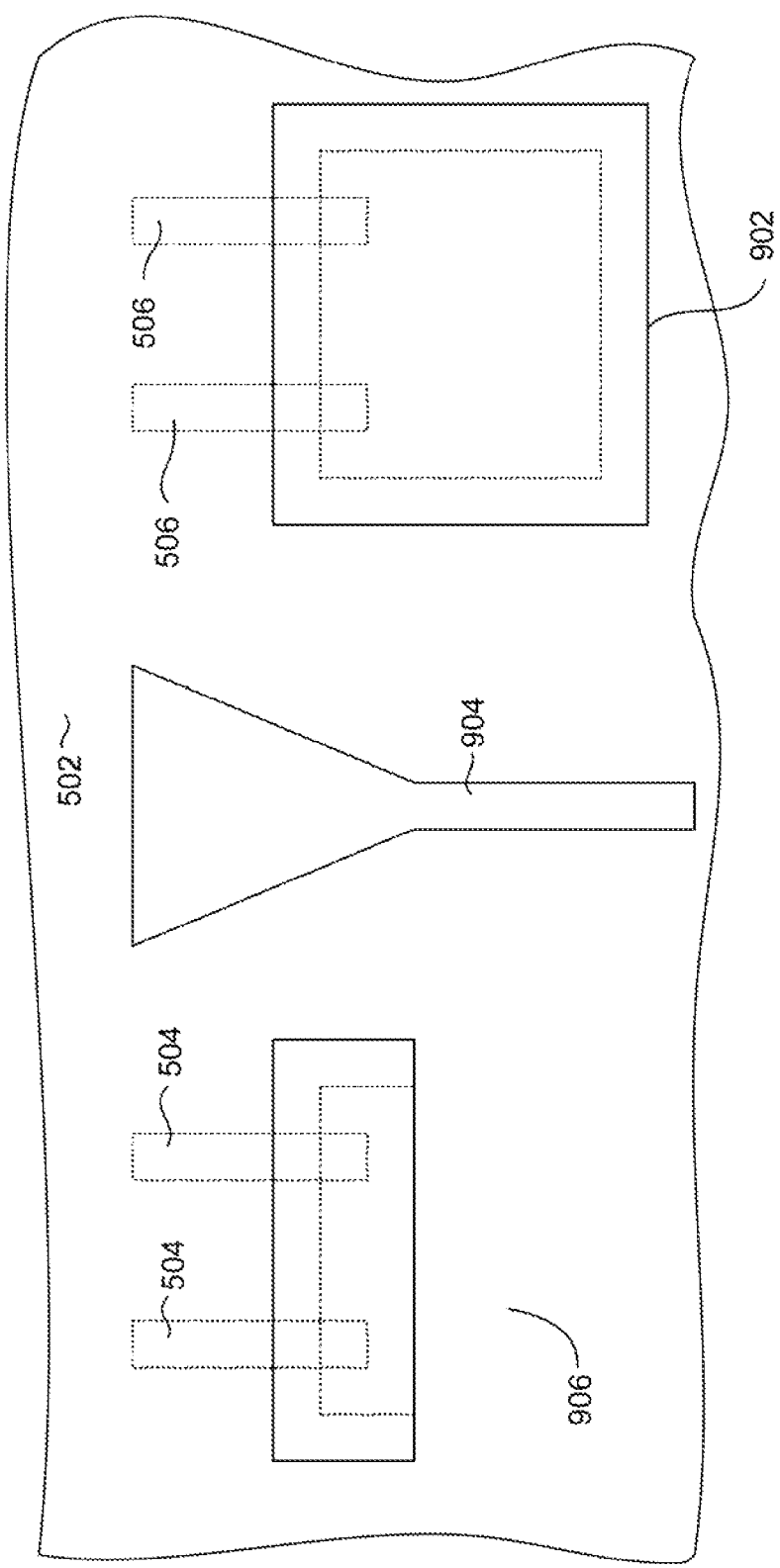
Figure 11:
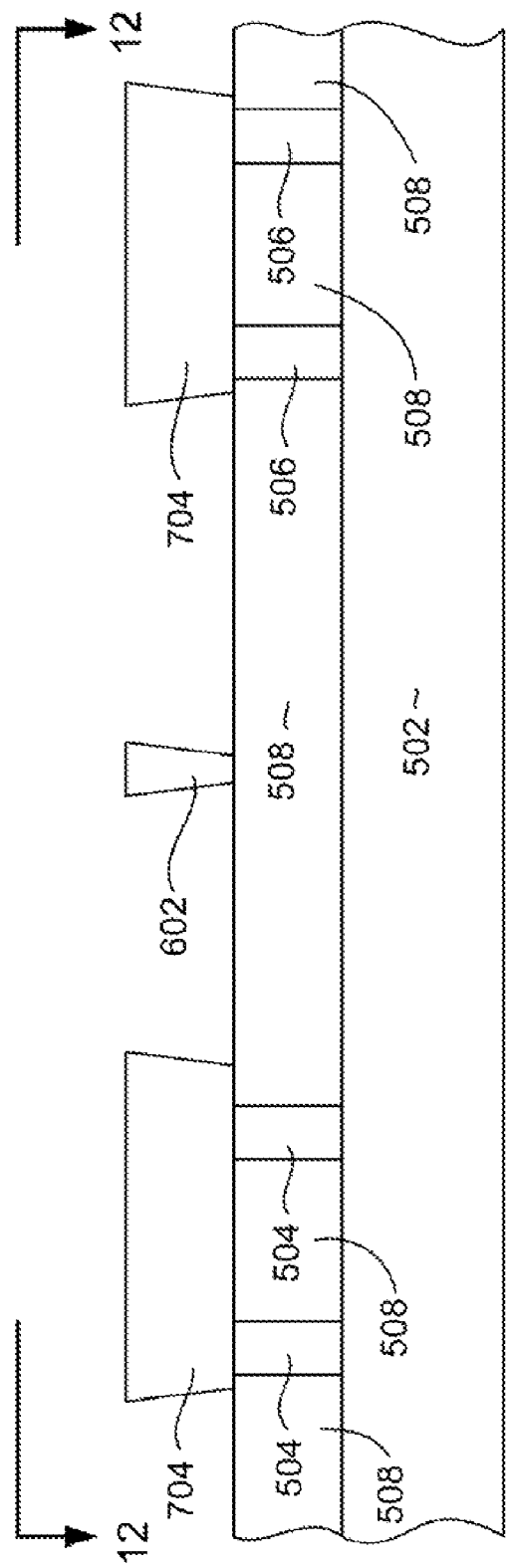

Then, an ion milling can be performed to remove portions of the laminate layer 602 and non-magnetic metal layer 704 that are not protected by the mask 906, resulting in a structure as shown in FIGS. 10A and 10B. A portion of the mask layers 802 will likely be consumed in the process. The mask structure 802 can be removed by a process that can include, for example, depositing a refill layer and performing a chemical mechanical polishing process, or wet stripping process leaving a structure as shown in FIG. 11. The hard mask layer 804 can be left behind if desired to provide a trailing gap layer for a trailing shield (not shown). Other processes related to forming a wrap around trailing magnetic shield would likely also be performed here, but are not shown for clarity.

Figure 12:
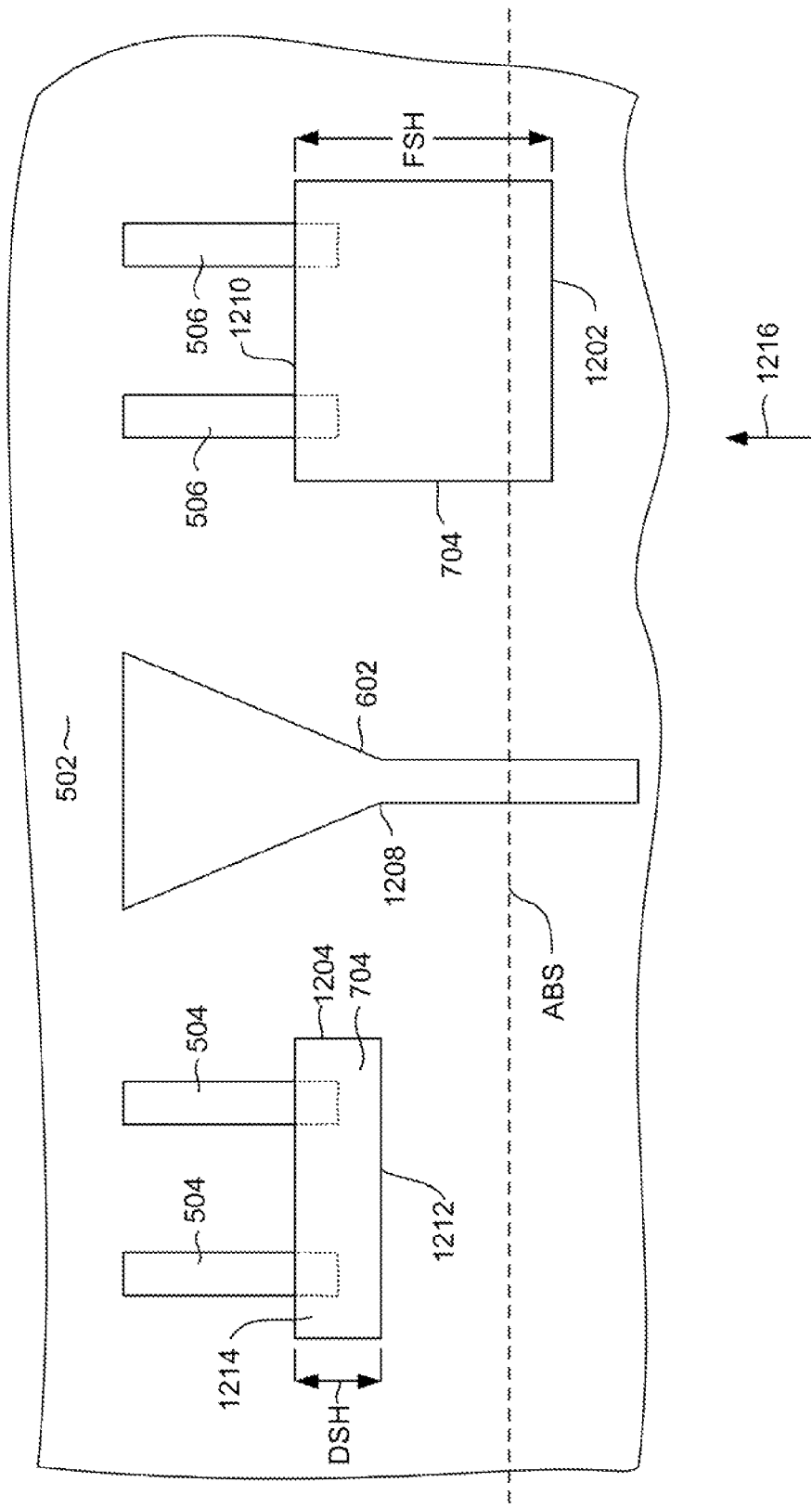

With reference now to FIG. 12 the shape of the resulting write pole 602 can be seen. The remaining non-magnetic metal 704 forms first and second electrical lapping guides 1202, 1204. As mentioned above, the air bearing surface of a write head is defined by a lapping process that is performed after a row of sliders is cut from a wafer. FIG. 12 shows a write head 602 and first and second lapping guides 1202, 1204 that are formed on a row of sliders in an intermediate stage of manufacture, before the wafer has been cut into rows of sliders. To define the air bearing surface, a lapping operation will remove material from the direction indicated by arrow 1206. Ideally lapping should be terminated when the desired air bearing surface plane (indicated by dashed line ABS) has been reached. This location of the air bearing surface determines the flare point of the write pole 602 by defining the location of the flare point 1208 relative to the air beating surface ABS.

The electrical lapping guide 1202 can be used to indicate when lapping should be terminated to accurately locate the air beating surface at the intended air bearing surface plane ABS. As lapping progresses, material will be removed from the lapping guide 1202 causing the electrical resistance across the electrical lapping guide 1202 to increase. When the electrical resistance reaches a predetermined level (indicating that the ABS plane has been reached), lapping is terminated. Therefore, it can be seen that the location of the back edge 1210 of the lapping guide 1202 relative to the ABS and the flare point 1208 is critical to proper definition of the ABS.

As can be seen, the front edge of the lapping guide 1204 is defined in the same patterning steps (photolithography, reactive ion etch, ion milling) that define the flare point 1208 of the write pole 602. The present invention provides a way to allow the lapping guide 1202 to provide accurate information to precisely and reliably locate a feature such as the ABS relative to another feature such as the flare point 1208 through utilizing the dummy lapping guide 1204, which establishes correlation between its front edge and the flare point 1208 through the same patterning steps.

In order to account for variations resulting from manufacturing processes such as ion milling and photolithographic patterning, a dummy lapping guide (dummy ELG) 1204 is provided. As described above, the back edge of this dummy ELG 1204 is formed using the same processes used to define the functional ELG 1202, and the front edge of the dummy lapping guide 1204 is formed using the same process used to define the flare point 1208. Therefore, it is self aligned with these structures.

The dummy ELG 1204 preferably has a front edge 1212 that is aligned with a desired feature such as the flare point 1208. The dummy ELG has a nominal thickness or stripe height DSH, which is the distance from the front edge 1212 to a back edge 1214 preferably measured perpendicular to the ABS plane. This nominal stripe height DSH is a dimension that the dummy ELG is patterned to achieve, and may be about 0.2-0.4 um in the present example application.

This nominal stripe height DSH is patterned to achieve a given dimension, in the same manner that the flare point 1208 of the write head is patterned to have a desired location. However, as mentioned above, the actual location of these features can vary due to manufacturing processes. Therefore, just as the actual location of the flare point 1208 can vary, the actual distance between the front edge and back edge of the dummy ELG 1204 can vary. This variance in the distance between the front and back, edges 1212, 1214 of the dummy ELG 1204 can, however, be determined. The actual distance between the front and back edges 1212, 1214 can be accurately determined by measuring the electrical resistance of the dummy lapping guide 1204. A higher resistance indicates that the back edge 1214 is closer to the front edge 1212. This correlates to the actual location movement of the flare point 1208.

As described above, the actual location of the back edge 1214 of the dummy ELG can be accurately and reliably calculated. However, this actual location of the back edge 1214 of the dummy lapping guide 1214 also correlates to the actual location of the back edge 1210 of the actual, functional ELG 1202. This means that the actual location of the back edge 1210 of the functional ELG can be known relative to the flare point 1208 (or other desired feature) through the back edge 1214 of dummy ELG 1202, whose distance to its front edge 1212 that tracks the movement of flare point 1208, can be obtained by measuring the resistance of the dummy ELG 1204. Once the actual location of the back edge 1210 of the functional lapping guide 1202 is known, the point at which lapping should be terminated (actual desired ABS plane) can be determined during lapping. This is accomplished by determining what the electrical resistance of the lapping guide 1202 will be when the actual desired ABS plane has been reached. This electrical resistance, of course, correlates directly with the distance between the back edge 1210 and the front lapped edge of the lapping guide 1202 during lapping.

It should be pointed out that the above description of a method of constructing a dummy lapping guide 1202 and using that dummy lapping guide to accurately locate a flare point of a write head has been presented for purposes of clear illustration of the concept of the invention. This use of a dummy lapping guide to compensate for manufacturing process variations can be used to accurately locate any variety of features that require accurate front edge placement.

With reference to FIG. 12, the functional lapping guide 1202 has a stripe height $FSH_i$ (wherein "i" denotes one of the three stripe heights) and the dummy lapping guide has a stripe height $DSH_i$. The stripe height $FSH_i$ of the functional lapping guide is the stripe height of the mask or $SH_{SWafer}$, plus the windage $W_i$ from the photolithography patterning process and the ELG milling process. The stripe height $DSH_i$ of the dummy lapping guide is, however, equal to the stripe height or $SHo_{Wafer}$, which is defined by the two masks (one is that, used to form the dummy ELG and the other is mask 906 in FIG. 9B), plus ½ the windage $W_i$ from the lithographic patterning process and the ELG milling process plus the windage $W_o$ of the milling used to define the write pole flare point.

Therefore, $FSH_i = SH_{SWafer} + W_i$, and $DSH_i = SHo_{Wafer} + \frac{1}{2} W_i + W_o$. So the measured resistances for the functional ELG and the dummy ELG, which are R(functional ELG) and R(dummy ELG), can be described by the following 6 equations from three stripe heights:

$$R(\text{dummy } ELG) = R_{Lead} + \frac{K}{SHo_{Wafer} + 1/2 Wi + Wo}$$

$$R(\text{functional } ELG) = R_{Lead} + \frac{K}{SH_{SWafer} + Wi}$$

Where $R_{lead}$ is the resistance of the leads 504, 506, and K is a constant. There are six unknowns, which include the three windages $W_i$ from three stripe heights, and one windage $W_o$, plus $R_{lead}$ and K. They can be solved from above 6 equations.

The stripe height of the functional ELG during lapping SH(functional ELG)$_{lapping}$ can be calculated from the solved six unknowns and the measured lapping resistance through, the following equation, $$SH(\text{functional } ELG)_{lapping} = \frac{K}{R - R_{Lead}}$$

So flare point (FP) control can be achieved by controlling lapping of the functional ELG stripe height to a new target to achieve design required FP as below, $$FP = SH(\text{fuctional } ELG)_{lapping} - DSHi$$
$$= \frac{K}{R - R_{Lead}} - 1/2Wi - Wo - SHowafer$$
$$SH(\text{fuctional } ELG)_{lapping} = \frac{K}{R - R_{Lead}} - 1/2Wi - Wo$$

From the above described method, then, a controlled lapping process can be made to determine the necessary resistance across the functional ELG to achieve a desired flare point during lapping.

While the above process has been described with reference to locate a flare point of a structure, the process can be used to accurately locate a front edge of any structure relative to a lapping defined plane such as an air bearing surface of a slider. While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head, comprising:
   providing a substrate;
   forming a device on the substrate, the device having a feature;
   forming a functional electrical lapping guide on the substrate; and
   forming a dummy lapping guide on the substrate, the dummy lapping guide having a front edge and a back edge, the distance between the front edge edge and the back edge defining a stripe height;
   determining a difference between an intended nominal stripe height of the dummy lapping guide and an actual stripe height of the dummy lapping guide to calculate a variation of an edge of the dummy electrical lapping guide; and
   based on the calculated variation, determining an actual location of a back edge of the functional lapping guide relative to the feature of the device.

2. A method as in claim 1 further comprising, after determining the actual location of the back edge of the functional lapping guide, performing a lapping operation while measuring an electrical resistance of the functional lapping guide, and terminating the lapping operation when the resistance reaches a predetermined value.

3. A method as in claim 1 wherein the actual stripe height of the dummy lapping guide is determined by measuring an electrical resistance of the dummy lapping guide.

4. A method as in claim 1 wherein the dummy electrical lapping guide, functional lapping guide and the device are defined by a common photolithography process.

5. A method as in claim 1 wherein the dummy electrical lapping guide, functional lapping guide and the device are defined by a common photolithography process and a common ion milling process.

6. A method as in claim 1 wherein the dummy lapping guide has an edge that is aligned with the feature of the device.

7. A method as in claim 1 wherein the dummy lapping guide and the functional lapping guide comprise a non-magnetic metal, and the device comprises a magnetic material.

8. A method as in claim 1 wherein the dummy lapping guide comprises a non-magnetic metal and the device comprises a lamination of magnetic layers and thin non-magnetic layers.

9. A method as in claim 1 wherein the device is a write pole of a write head, and the feature of the device is a flare point.

10. A method as in claim 1 wherein the device has a critical front edge that needs to be defined during lapping.

11. A method for manufacturing a magnetic write head, comprising:
    providing a substrate;
    forming first and second dummy lapping guide leads and first and second functional lapping guide leads on the substrate;
    depositing a non-magnetic, electrically insulating fill layer;
    performing a chemical mechanical polishing process sufficiently to expose the dummy lapping guide leads and functional lapping guide leads;
    depositing a magnetic material in a device region and a non-magnetic metal in a dummy lapping guide region and in a functional lapping guide region;
    forming a mask structure over magnetic write pole material and over the non-magnetic metal, the mask structure including a write pole mask formed over the magnetic write pole material, a dummy lapping guide mask over a portion of the non-magnetic metal, and a functional lapping guide mask over another portion of the non-magnetic metal;
    performing an ion milling to remove portions of the magnetic write pole material and non-magnetic metal that are not protected by the mask structure, thereby forming a dummy lapping guide, write pole and functional lapping guide;
    determining an intended, nominal stripe height of the dummy lapping guide based on a stripe height defined by two masks at two different process steps;
    determining the actual stripe height of the dummy lapping guide based on an electrical resistance of the dummy lapping guide as measured across the first and second dummy lapping guide leads;
    determining an amount of back edge variation based on the difference between the intended nominal stripe height and the actual stripe height;
    determining an actual location of a back edge of the functional lapping guide;
    calculating a predetermined electrical resistance of the functional lapping guide based on the determined actual location of the back edge of the functional lapping guide; and
    performing a lapping operation, and terminating the lapping operation when the predetermined resistance has been reached.

12. A method as in claim 11 wherein the depositing a magnetic material in a device region and a non-magnetic metal in a dummy lapping guide region and in a functional lapping guide region further comprises:
- depositing a magnetic write pole material;
- forming a bi-layer mask over a region where a device will be formed;
- performing an ion milling to remove portions of the magnetic write pole material that are not protected by the bi-layer mask;
- depositing a non-magnetic metal; and
- lifting off the bi-layer mask.

13. A method as in claim 11 wherein the calculating a predetermined electrical resistance of the electrical lapping guide further comprises determining an optimal front edge location of the functional lapping guide that will provide a desired spacing between an air bearing surface and a flare point of the write pole;
- determining a stripe height as measured between the optimal front edge and the actual back edge of the functional write pole; and
- calculating an electrical resistance of a lapping guide having a stripe height measured between the optimal front edge and the actual back edge.

14. A method as in claim 13 wherein the non-magnetic metal comprises a material selected from the group consisting of Ru, Ir, Rh, NiCr, Au, W and Ta.

15. A method as in claim 11 wherein the non-magnetic metal comprises a material selected from the group consisting of Ru, Ir, Rh, NiCr, Au, W and Ta, and the magnetic write pole material comprises a lamination of magnetic layers and thin non-magnetic layers.

16. A method as in claim 11 wherein the forming a mask structure further includes:
- depositing a hard mask layer;
- depositing a photoresist mask;
- photolithographically patterning the photoresist mask to form a write pole mask, a dummy lapping guide mask and a functional lapping guide mask;
- performing a reactive ion etching to transfer the image of the photoresist mask onto the hard mask layer.

17. A method as in claim 11 wherein the forming a mask structure further includes:
- depositing a hard mask layer;
- depositing an image transfer layer;
- depositing a photoresist mask;
- photolithographically patterning the photoresist mask to form a write pole mask, a dummy lapping guide mask and a functional lapping guide mask;
- performing a reactive ion etching to transfer the image of the photoresist mask onto the image transfer layer and the hard mask layer.

18. A method as in claim 17 wherein the dummy lapping guide is formed so that the front edge of the dummy lapping guide is aligned with a flare point of the write pole.

19. A method as in claim 11 wherein the dummy lapping guide mask has a back edge, the functional lapping guide has a back edge and the back edge of the dummy lapping guide is aligned with the back edge of the functional lapping guide.

* * * * *